(12) United States Patent
Wang et al.

(10) Patent No.: US 11,644,338 B2
(45) Date of Patent: May 9, 2023

(54) GROUND TEXTURE IMAGE-BASED NAVIGATION METHOD AND DEVICE, AND STORAGE MEDIUM

(71) Applicant: BEIJING GEEKPLUS TECHNOLOGY CO., LTD., Beijing (CN)

(72) Inventors: Yingchun Wang, Beijing (CN); Bin Ji, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 16/920,440

(22) Filed: Jul. 3, 2020

(65) Prior Publication Data

US 2020/0333162 A1 Oct. 22, 2020

Related U.S. Application Data

(63) Continuation of application No. PCT/CN2019/098089, filed on Jul. 29, 2019.

(30) Foreign Application Priority Data

Oct. 19, 2018 (CN) .......................... 201811220749.1

(51) Int. Cl.
    *G06T 7/37*      (2017.01)
    *G06T 7/73*      (2017.01)
    (Continued)

(52) U.S. Cl.
    CPC ....... *G01C 21/383* (2020.08); *G01C 21/3837* (2020.08); *G05D 1/0274* (2013.01);
    (Continued)

(58) Field of Classification Search
    CPC .............. G01C 21/383; G01C 21/3837; G01C 21/005; G05D 1/0274; G05D 2201/0216;
    (Continued)

(56) References Cited

U.S. PATENT DOCUMENTS

| | | | |
|---|---|---|---|
| 10,636,114 B2 * | 4/2020 | Qi ............................ | G06T 7/44 |
| 2012/0154579 A1 | 6/2012 | Hampapur et al. | |
| 2017/0213352 A1 | 7/2017 | Liu et al. | |

FOREIGN PATENT DOCUMENTS

| | | |
|---|---|---|
| CN | 101008566 A | 8/2007 |
| CN | 104848858 A | 8/2015 |

(Continued)

OTHER PUBLICATIONS

Xi et al. "A new method for indoor low-cost mobile robot SLAM." 2017 IEEE International Conference on Information and Automation (ICIA). IEEE, 2017. (Year: 2017).*

(Continued)

*Primary Examiner* — Gandhi Thirugnanam
*Assistant Examiner* — Michael Adam Shariff
(74) *Attorney, Agent, or Firm* — Hodgson Russ LLP

(57) ABSTRACT

A navigation method based on ground texture images, an electronic device and storage medium. The method includes: performing transform domain based image registration on an acquired image of a current frame and an image of a previous frame, and determining a first pose of the image of the current frame; determining whether the image of the current frame meets a preset condition, and if so, inserting the image of the current frame as the key-frame image into a map, and performing loop closure detection and determining a loop key-frame image; performing transform domain based image registration on the image of the current frame and the loop key-frame image, and determining a second pose of the image of the current frame; and determining an (Continued)

accumulated error according to the first pose and the second pose, and correcting the map according to the accumulated error.

17 Claims, 5 Drawing Sheets

(51) Int. Cl.
 G06T 7/42 (2017.01)
 G01C 21/00 (2006.01)
 G05D 1/02 (2020.01)
 G06T 1/00 (2006.01)

(52) U.S. Cl.
 CPC .............. *G06T 1/0014* (2013.01); *G06T 7/37* (2017.01); *G06T 7/42* (2017.01); *G06T 7/73* (2017.01); *G05D 2201/0216* (2013.01); *G06T 2207/30244* (2013.01)

(58) Field of Classification Search
 CPC .......... G05D 2201/0213; G05D 1/0246; G06T 1/0014; G06T 7/37; G06T 7/73; G06T 2207/30244; G06T 7/74; G06T 2207/10016; G06T 2207/20056
 See application file for complete search history.

(56) References Cited

FOREIGN PATENT DOCUMENTS

| CN | 107662875 | * | 7/2016 | ............ B66B 29/06 |
|---|---|---|---|---|
| CN | 106485744 | A | 3/2017 | |
| CN | 107160395 | * | 6/2017 | ............ B25J 9/1602 |
| CN | 107392964 | * | 7/2017 | ............... G06T 7/73 |
| CN | 106996777 | A | 8/2017 | |
| CN | 106996781 | A | 8/2017 | |
| CN | 107160395 | A | 9/2017 | |
| CN | 107909612 | * | 12/2017 | ............... G06T 7/70 |
| CN | 108108764 | * | 12/2017 | ........... G06K 9/6282 |
| CN | 107909612 | A | 4/2018 | |
| CN | 109556596 | A | 4/2019 | |
| JP | 2006018562 | | 1/2006 | |
| JP | 2010117847 | | 5/2010 | |
| JP | 5147015 | | 2/2013 | |
| JP | 2017111688 | | 6/2017 | |
| JP | 2017134832 | | 8/2017 | |
| WO | 2019169540 | * | 3/2018 | ............... G05D 1/10 |

OTHER PUBLICATIONS

Sarvaiya et al. "Image registration using log polar transform and phase correlation to recover higher scale." Journal of pattern recognition research 7.1 (2012): 90-105 (Year: 2012).*

JPO, Office Action for JP Application No. 2020-560540, dated Jan. 22, 2021.

* cited by examiner

US 11,644,338 B2

GROUND TEXTURE IMAGE-BASED NAVIGATION METHOD AND DEVICE, AND STORAGE MEDIUM

CROSS REFERENCES TO RELATED APPLICATIONS

This application is the continuation application of International Application No. PCT/CN2019/098089, filed on Jul. 29, 2019, which is based upon and claims priority to Chinese Patent Application No. 201811220749.1, filed on Oct. 19, 2018, the entire contents of which are incorporated herein by reference.

TECHNICAL FIELD

The present application relates to the field of robotics, for example, to a navigation method and apparatus based on ground texture images, a device and a storage medium.

BACKGROUND

With the development of information technology and automatic control technology, robots have gradually come into people's daily life. They can replace the work of humans in complex environments, and have autonomous planning, self-organization, and adaptive abilities. For example, an automated guided vehicle (AGV) for warehousing can transport goods based on simultaneous localization and mapping (SLAM) navigation.

In related art, when a robot performs visual SLAM navigation, it can be able to map the environment and localize itself in that map simultaneously, by detecting feature points by using an ORB (Oriented FAST and Rotated Binary Robust Independent Elementary Features) algorithm. However, for images in a complex scenario, feature positions are highly complex, and feature selection and extraction are difficult, resulting in lower precision of SLAM navigation depending on image feature information. On the other hand, images in a simple scenario have fewer feature points, so that the reliability is lowered, and thus the precision of SLAM navigation is also affected.

SUMMARY

The present application provides a navigation method and apparatus based on ground texture images, a device and a storage medium, to solve the technical problem of low precision when a robot performs SLAM navigation by using image feature information.

The present application provides a navigation method based on ground texture images, including:
  performing transform domain based image registration on an acquired image of the current frame and an image of the previous frame, and determining a first pose of the image of the current frame;
  determining whether the image of the current frame meets a preset condition for creating a key-frame image, and in response to determining that the image of the current frame meets the preset condition, inserting the image of the current frame as a key-frame image into a map, and performing loop closure detection and determining a loop key-frame image;
  performing transform domain based image registration on the image of the current frame and the loop key-frame image, and determining a second pose of the image of the current frame; and
  determining an accumulated error according to the first pose and the second pose of the image of the current frame, and correcting the map according to the accumulated error, so as to perform navigation according to the corrected map.

The present application further provides an electronic device, including:
  at least one processor; and
  a memory configured to store at least one program, wherein
    the at least one program, when executed by the at least one processor, causes the at least one processor to implement the navigation method based on ground texture images according to any embodiment of the present application.

The present application further provides a computer-readable storage medium storing a computer program that, when executed by a processor, implements the navigation method based on ground texture images according to any embodiment of the present application.

The present application provides a navigation method and apparatus based on ground texture images, a device and a storage medium. In SLAM navigation based on ground texture images, SLAM tracking is achieved by transform domain based image registration to determine a first pose, and in the case where it is determined that an image of the current frame meets a preset condition for creating a key-frame image, a key-frame image is added to a map and loop closure detection is performed, a second pose is calculated according to a loop key-frame image determined by the loop closure detection through transform domain based image registration, and an accumulated error is determined according to the first pose and the second pose, so as to correct the map according to the accumulated error. In this way, the accuracy of navigation in a complex environment can be achieved.

DETAILED DESCRIPTION OF THE EMBODIMENTS

Figure 1:
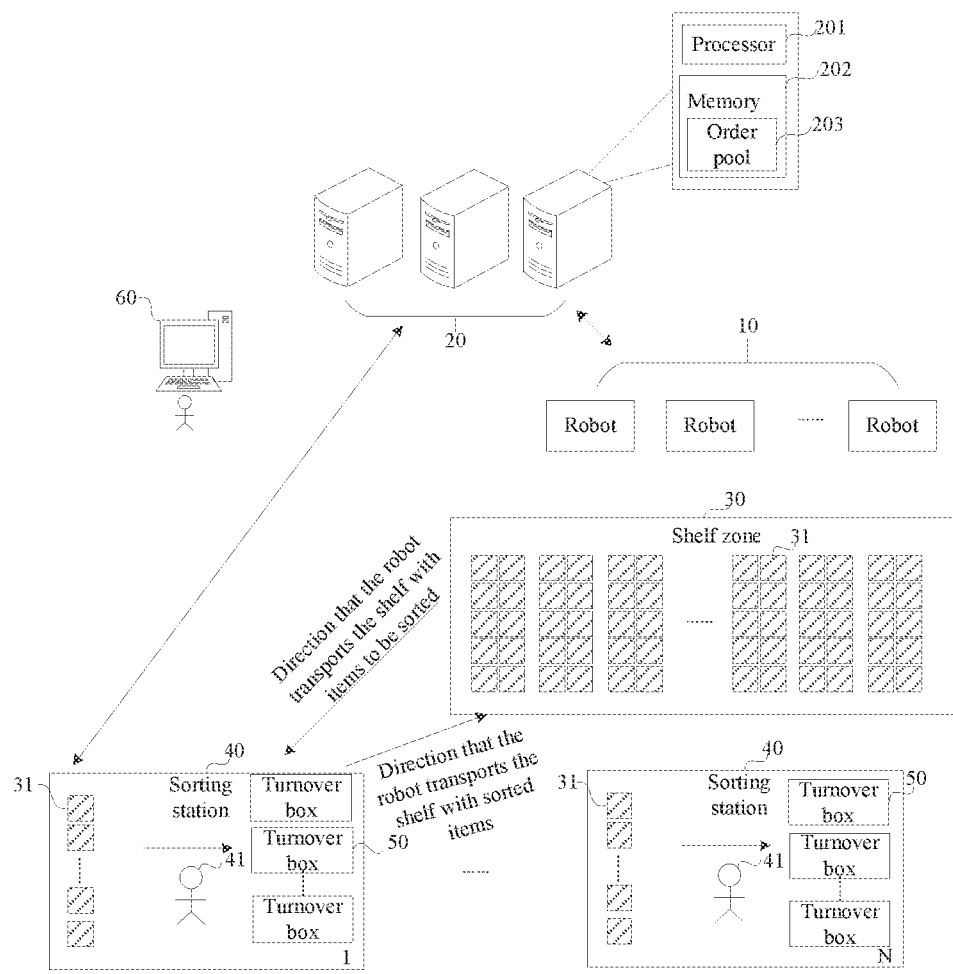
FIG. 1 is a system structure diagram of a goods sorting system in the related art.

Referring to a system structure diagram of a goods sorting system shown in FIG. 1, the goods sorting system includes at least one robot 10, such as an AGV, a control system 20, a storage zone 30, and at least one sorting station 40. In an embodiment, the storage zone 30 is provided with a plurality of warehousing containers 31, and various goods are placed in the warehousing containers 31. The warehousing containers 31 are containers that can contain goods, and can be shelves, pallets, or packing cases. Taking shelves as an example in FIG. 1. As shown in FIG. 1, shelves can be that in a supermarket in which a variety of items are placed, and a plurality of shelves are arranged in array. In each sorting station 40, a goods sorting person 41 or sorting equipment (such as a mechanical hand) performs the sorting operation. The sorting station 40 is equipped with an allocating wall, where the allocating wall is provided with turnover boxes 50 configured to store sorted goods.

The control system 20 is a software system running on a server and capable of data storage and information processing. The control system 20 can be connected to the transport robot 10, a hardware input system, and other software systems in a wireless or wired manner. The control system 20 can include at least one server, and can be a centralized control architecture or a distributed computing architecture. The server has a processor 201 and a memory 202, and an order pool 203 can be provided in the memory 202.

The control system 20 communicates with the robot 10 wirelessly, and a working person uses an operation console 60 to operate the control system 20, and the robot 10 performs a goods transport task under the control of the control system 20. For example, the control system 20 plans a movement path for the robot 10 according to the transport task, and the robot 10 automatically navigates along an empty space (a part of a passageway of the robot 10) among the shelf array according to the movement path. To conveniently plan the movement path for the robot 10, a working area of the robot 10 (the working area includes at least a shelf zone 30 and an area where the sorting station 40 is located) is divided into a plurality of sub-areas (i.e. cells) in advance. The robot 10 moves along each sub-area progressively to form a motion trail. To achieve autonomous and rapid and accurate movement of the robot 10 to a target position, a navigation method based on ground texture images in the present application is provided to improve the accuracy of navigation.

The present application is described in conjunction with the drawings and embodiments. It can be understood that the specific embodiments described herein are only used for explaining the present application, rather than limiting the present application. In addition, it should be noted that, for convenience of description, only parts related to the present application, instead of the entire structure, are shown in the drawings.

Embodiment I

Figure 2:
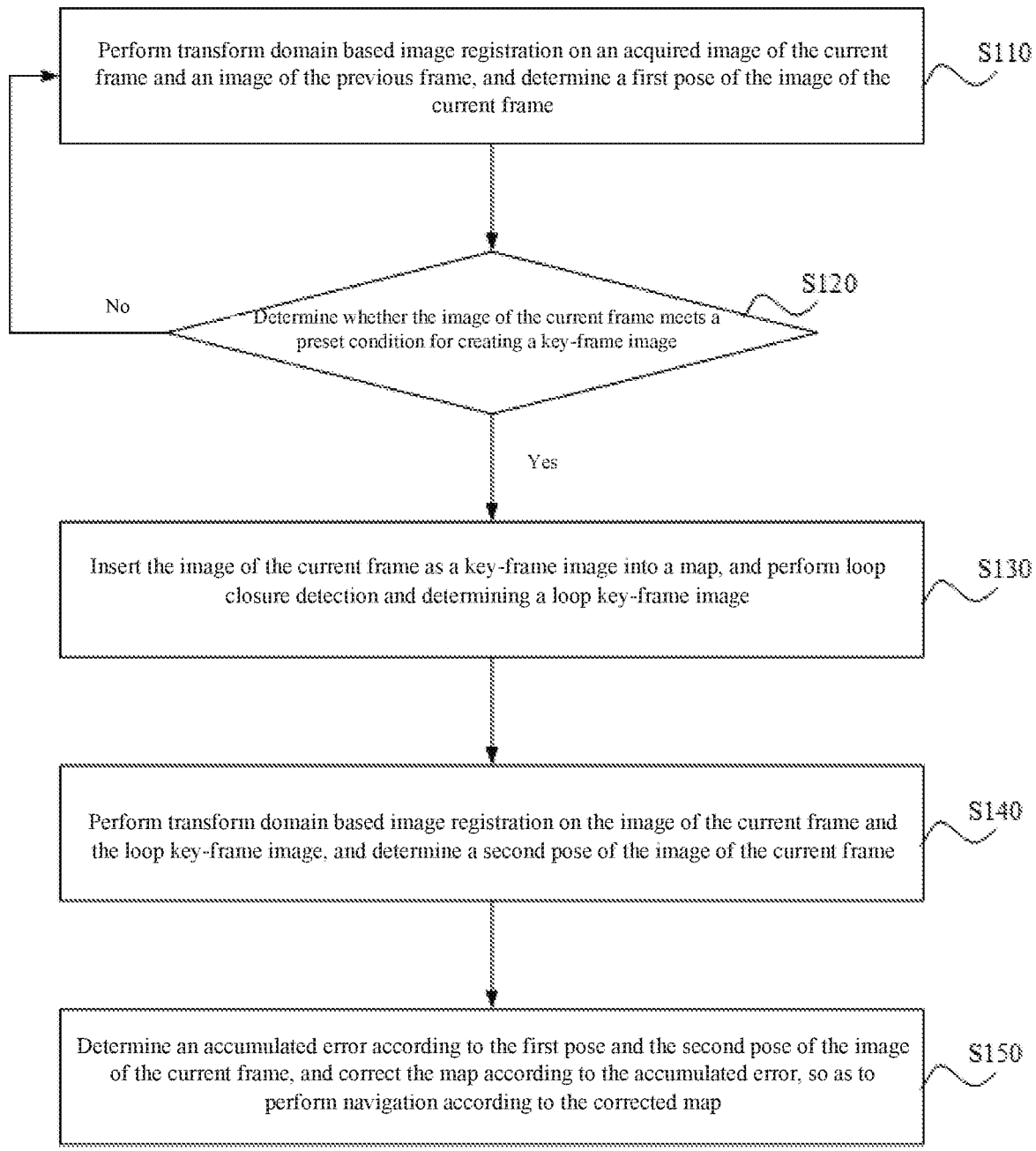
FIG. 2 is a schematic flow diagram of a navigation method based on ground texture images according to an embodiment of the present application.

FIG. 2 is a flow diagram of a navigation method based on ground texture images provided in an embodiment of the present application. This embodiment is applicable to a scenario where a robot navigates based on SLAM. The method can be performed by a navigation apparatus based on ground texture images, and can be integrated in an electronic device, such as a robot. In this embodiment, the navigation method based on ground texture images mainly includes the following steps.

Step S110: performing transform domain based image registration on an acquired image of the current frame and an image of the previous frame, and determining a first pose of the image of the current frame.

In this embodiment, in SLAM navigation based on ground texture features, it mainly includes tracking, map building, relocation, and loop detection. In an embodiment, tracking is real-time location, by calculating a pose of an image of the current frame according to a texture image of the previous frame. Therefore, before the tracking is performed, the robot is initialized, that is, initial values of global coordinates at an initial position are determined. In an embodiment, initial values of global coordinates can be determined at an initial position by identifying collected two-dimensional code information. In an embodiment, when a pose of an image of the current frame is calculated after the initialization is completed, transform domain based image registration can be performed on an acquired image of the current frame and an image of the previous frame to determine a first pose of the image of the current frame. Here the first pose includes a rotation and a translation of the movement of the image of the current frame.

In an embodiment, image registration can be performed according to the following steps: (1) performing Fourier transformation on an acquired image $f_1$ of the previous frame and an image $f_2$ of the current frame to obtain $F_1$ and $F_2$; (2) eliminating low-frequency noise from $F_1$ and $F_2$ by using a high-pass filter; (3) converting the filtered images from a rectangular coordinate system to a log-polar coordinate form; (4) performing Fourier transformation on the images $f_1$ and $f_2$ in log-polar coordinates; (5) determining a cross-power spectrum R1 of the image f1 of the previous frame and the image f2 of the current frame in the log-polar coordinates based on a transformation result of step (4) and a calculation formula of the cross-power spectrum; (6) performing inverse Fourier transformation on the obtained power spectrum R1 to obtain an inverse Fourier transformation result IR1; (7) determining coordinates corresponding to a maximum peak value of the inverse Fourier transformation result IR1, and obtaining a scaling factor and a rotation factor according to the coordinates corresponding to the maximum peak value of the inverse Fourier transformation result IR1; (8) performing inverse transformation on the image f2 of the current frame according to the obtained scaling factor and rotation factor to obtain a new image f3; (9) performing fast Fourier transformation on the images f1 and f3 to obtain F1 and F3, calculating a power spectrum R2 of F1 and F3 based on a power spectrum calculation formula, and performing inverse Fourier transformation on R2 to obtain an inverse Fourier transformation result IR2; and (10) determining coordinates corresponding to a maximum peak value of the inverse Fourier transformation result IR2 as a translation parameter, and determining a first pose of the image of the current frame according to the translation parameter.

Step S120: determining whether the image of the current frame meets a preset condition for creating a key-frame image. In response to determining that the image of the current frame meets the preset condition, proceeding to steps S130-S150. In response to determining that the image of the current frame does not meet the preset condition, returning to step S110.

In SLAM technology, tracking and map building are performed synchronously. Thus, in the case where the image of the current frame is acquired, it also needs to determine whether the image of the current frame meets a preset condition for creating a key-frame image. If the preset condition is not met, the tracking step repeats. If the preset condition is met, map building and loop detection in steps S130-S150 needs to be performed. In an embodiment, the preset condition for creating a key-frame image includes: map building is in an idle state, and the number of image frames between the image of the current frame and the previous key-frame image is greater than a preset first threshold, which is 20 in an embodiment; and a global coordinate distance difference between the image of the current frame and the previous key-frame image is greater than a preset second threshold. In this embodiment, the global coordinate distance difference between the image of the current frame and the previous key-frame image refers to an offset distance between the image of the current frame and the previous key-frame image, and can be calculated by a mathematical formula based on global coordinates of the image of the current frame and the previous key-frame image respectively, where the respective global coordinates of the image of the current frame and the previous key-frame image are determined according to respective poses of the image of the current frame and the previous key-frame image and initial values of global coordinates.

Step S130: inserting the image of the current frame as a key-frame image into a map, and performing a loop closure detection and determining a loop key-frame image.

In response to determining that the image of the current frame meets the preset condition for creating a key-frame image, the image of the current frame is inserted as a key-frame image into a map to build a map. In an embodiment, a map is formed jointly by a key-frame image as a node and sides determined according to a constraint relationship between multiple frame images. Furthermore, to ensure the accuracy of an estimated robot movement trail and a built map over a long period of time, it needs to effectively detect an event that a robot camera passes a same place, so it needs to perform loop closure detection while creating a key-frame image. A loop key-frame image is determined according to a loop closure detection result, and the loop key-frame image can be a key-frame image that is most similar to the image of the current frame among all key-frame images forming a loop.

Step S140: performing transform domain based image registration on the image of the current frame and the loop key-frame image, and determining a second pose of the image of the current frame.

After the loop key-frame image is determined, transform domain based image registration is performed on the image of the current frame and the loop key-frame image, and a second pose of the image of the current frame is determined. In an embodiment, the second pose includes a rotation and a translation of the movement of the image of the current frame. For the image registration process, reference can be made to the description of step S110, which is not repeated here.

Step S150: determining an accumulated error according to the first pose and the second pose of the image of the current frame, and correcting the map according to the accumulated error, so as to perform navigation according to the corrected map.

In this embodiment, as a pose of an image of the current frame is calculated according to an image of the previous frame in the SLAM technology, that is, a pose of a subsequent frame depends on a pose of a previous frame, an accumulated error will inevitably occur after a period of time, which affects the accuracy of the built map.

Therefore, loop closure detection is performed and a second pose is determined, and an accumulated error is determined according to the first pose and the second pose of the image of the current frame. A transformation matrix between multiple frames of key-frame images in the loop, as well as the built map are corrected, according to the accumulated error.

In this embodiment, after the map is built, during the movement of the robot, information of the surrounding environment is acquired in real time by a sensor, and the information is matched with the built map to determine the position of the robot in the surrounding environment and then perform navigation movement.

In this embodiment, in SLAM navigation based on ground texture images, SLAM tracking is achieved by transform domain based image registration to determine a first pose, and in the case where it is determined that an image of the current frame meets a preset condition for creating a key-frame image, a key-frame image is added to a map and loop closure detection is performed, and a second pose is calculated, according to a loop key-frame image determined by the loop closure detection, through transform domain based image registration. An accumulated error is determined according to the first pose and the second pose, so as to correct the map according to the accumulated error. In this way, the accuracy of navigation in a complex environment can be achieved.

Embodiment II

Figure 3:
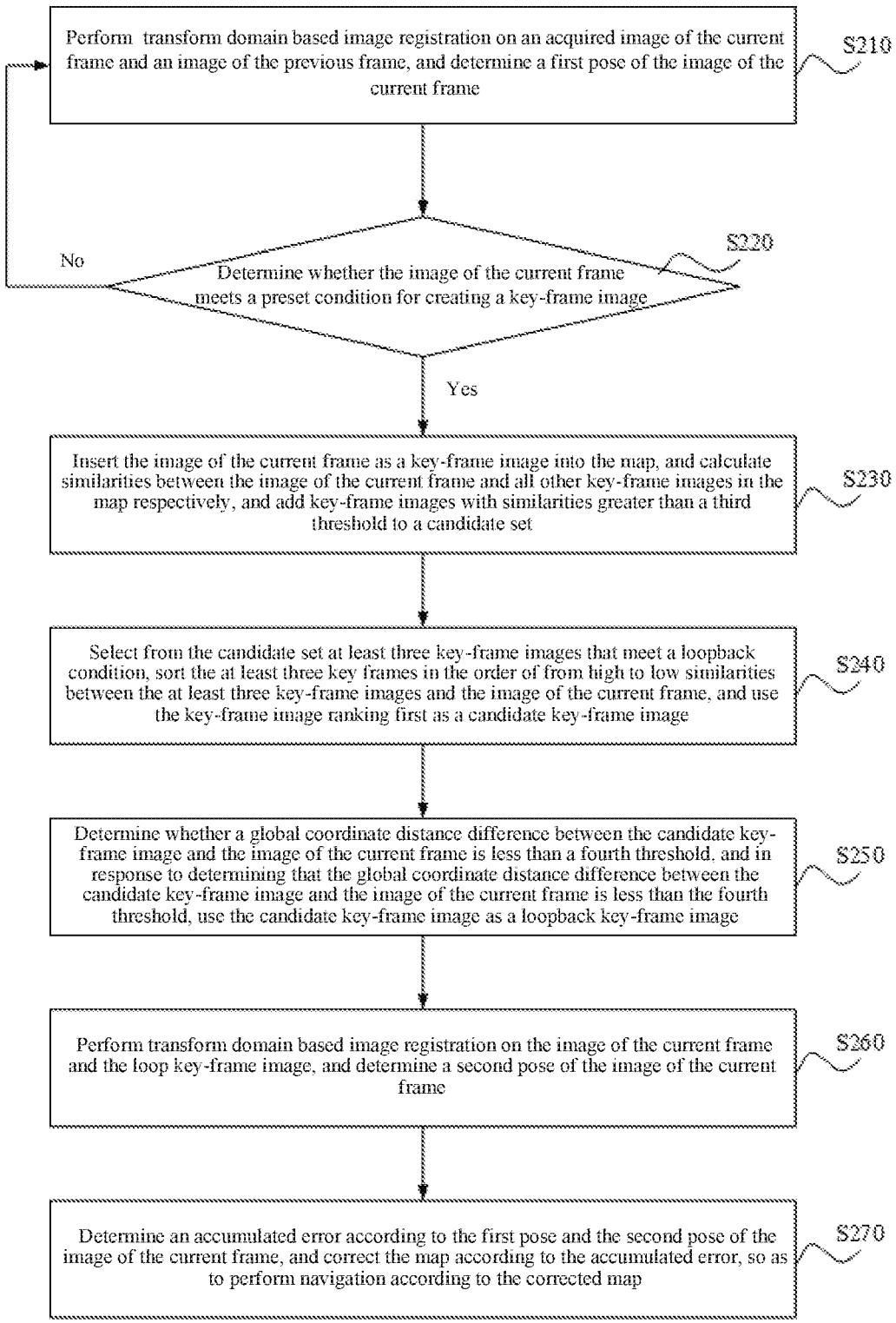
FIG. 3 is a schematic flow diagram of another navigation method based on ground texture images according to an embodiment of the present application.

FIG. 3 is a schematic flow diagram of another navigation method based on ground texture images according to an embodiment of the present application. This embodiment is described on the basis of the above embodiment, and the method includes the following steps.

Step S210: performing transform domain based image registration on an acquired image of the current frame and an image of the previous frame, and determining a first pose of the image of the current frame.

Step S220: determining whether the image of the current frame meets a preset condition for creating a key-frame image. In response to determining that the image of the current frame meets the preset condition, proceeding to steps S230-S270. In response to determining that the image of the current frame does not meet the preset condition, returning to step S210.

Step S230: inserting the image of the current frame as a key-frame image into the map, and calculating similarities between the image of the current frame and all other key-frame images in the map respectively, and adding key-frame images with similarities greater than a third threshold to a candidate set.

In this embodiment, after a new key-frame image is added to the map, loop closure detection is performed. Key-frame images of (forming) a loop closure may be selected first, where the closed loop means that the robot moves from a position and then after a period of time returns to that position. In an embodiment, selection can be performed according to similarities between other key-frame images in the map and the image of the current frame. The similarities between the image of the current frame and all other key-frame images in the map can be calculated respectively by the following two methods. In Method 1: scale invariant feature transform (SIFT) features are used to calculate the similarities between the image of the current frame and all other key-frame images in the map. For example, the number of matched points can be used as a calculation result of the similarities. In Method 2: in an image registration algorithm based on the transform domain, a discrete-time unit impulse function sequence is obtained after a phase correlation algorithm is carried out with rotation and translation, and a correlation peak represents a registration point of the two images, and directly reflects the degree of consistency between the two images. Therefore, transform domain based image registration is performed on the image of the current frame and all other key-frame images respectively, and a correlation peak value obtained by rotation and translation in a registration result can be used as a similarity calculation value. After the similarity between a key-frame image and the image of the current frame is determined by using any of the above methods, it can be determined whether the similarity is greater than a set third threshold, and if the similarity is greater than the third threshold, the key-frame image can be used as a candidate key-frame image and added to a candidate set. In this embodiment, the calculation of the similarity between the image of the current frame and each key-frame image is not limited to the aforementioned two methods, and may also be calculated by other similar algorithms, which are not limited herein.

Step S240: selecting from the candidate set at least three key-frame images that meet a loop condition, sorting the at least three key-frames in the order of from high to low similarities between the at least three key-frame images and the image of the current frame, and using the key-frame image ranking first as a candidate key-frame image.

There may be multiple loops in the candidate set, and for any loop, at least three key-frame images that meet a loop condition are selected from the candidate set. According to step S230, each key-frame image in the candidate set corresponds to a similarity. To detect a large (scale) closed-loop, a most similar key-frame image needs to be used, that is, a key-frame image with the highest similarity is used. Therefore, the at least three key-frames are sorted in the order of from high to low similarities between the at least three key-frame images and the image of the current frame, and the key-frame image ranking first is used as a candidate key-frame image.

Step S250: determining whether a global coordinate distance difference between the candidate key-frame image and the image of the current frame is less than a fourth threshold, and in response to determining that the global coordinate distance difference between the candidate key-frame image and the image of the current frame is less than the fourth threshold, using the candidate key-frame image as the loop key-frame image.

After a candidate key-frame image is determined, it also needs to further verify the candidate key-frame image to determine whether the candidate key-frame image can be used as a loop key-frame image. In an embodiment, for each key-frame image after image registration, a translation parameter corresponding to the key-frame image is stored correspondingly, so a global coordinate distance difference between the candidate key-frame image and the image of the current frame can be calculated, and if the distance difference is less than a set fourth threshold, the candidate key-frame image is used as the loop key-frame image.

If the global coordinate distance difference between the candidate key-frame image and the image of the current frame is greater than or equal to the fourth threshold, the candidate key-frame image cannot be used as the loop key-frame image, and it needs to select a candidate key-frame image from another loop, and further determine whether the candidate key-frame image can be used as a loop key-frame image.

Step S260: performing transform domain based image registration on the image of the current frame and the loop key-frame image, and determining a second pose of the image of the current frame.

Step S270: determining an accumulated error according to the first pose and the second pose of the image of the current frame, and correcting the map according to the accumulated error, so as to perform navigation according to the corrected map.

In this embodiment, in SLAM navigation based on ground texture images, SLAM tracking and loop closure detection are achieved by transform domain based image registration, and then an accumulated error is determined, so as to perform map correction according to the accumulated error to improve navigation precision. In addition, in the loop closure detection, in order to detect a large (scale) closed-loop, a most similar key-frame image is used. The similarities between key-frame images and the image of the current frame are calculated, which makes up for the lack of consideration of a similarity between two frame images when image registration is performed based on a transform domain.

Embodiment III

Figure 4:
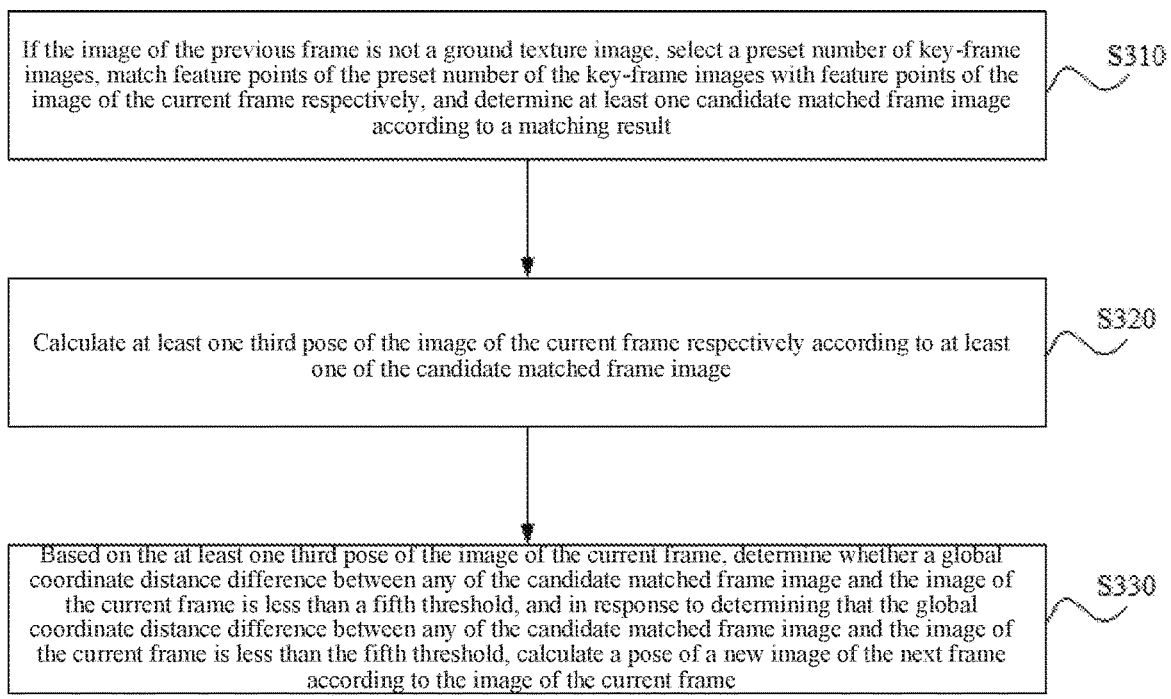
FIG. 4 is a schematic flow diagram of yet another navigation method based on ground texture images according to an embodiment of the present application.

FIG. 4 is a schematic flow diagram of yet another navigation method based on ground texture images according to an embodiment of the present application. This embodiment is described on the basis of the above embodiment. Referring to FIG. 4, the method further comprises the following steps.

Step S310: if the image of the previous frame is not a ground texture image, selecting a preset number of key-frame images, matching feature points of each of the preset number of the key-frame images with feature points of the image of the current frame, and determining at least one candidate matched frame image according to a matching result.

In this embodiment, if blocking or sudden movement occurs, resulting in that an acquired image of the previous frame is not a ground texture image, that is, features are not tracked, it needs to perform global relocation. In an embodiment, a preset number of key-frame images can be selected by enlarging the search scope, feature points of each of the preset number of the key-frame images are matched with feature points of the image of the current frame, and a candidate matched frame image is determined according to a matching result, that is, finding a key-frame image similar to the image of the current frame as a candidate matched image. Finally, a camera position is optimized based on the matching, and if valid data is enough, the tracking procedure will be executed continuously.

Step S320: calculating at least one third pose of the image of the current frame according to the at least one candidate matched frame image.

Based on selected at least one candidate matched frame image, at least one third pose of the image of the current frame is calculated successively by transform domain based image registration, here the third pose includes a rotation and a translation of the movement of the image of the current frame.

Step S330: based on the at least one third pose of the image of the current frame, determining whether a global coordinate distance difference between any of the at least one candidate matched frame image and the image of the current frame is less than a fifth threshold, and in response to determining that the global coordinate distance difference between any of the at least one candidate matched frame image and the image of the current frame is less than the fifth threshold, calculating a pose of a new image of the next frame according to the image of the current frame.

In this embodiment, the third poses of the image of the current frame image calculated based on different candidate matched frame images are different. Therefore, in the case where a global coordinate distance difference between a candidate matched frame image and the image of the current frame is less than a fifth threshold, it is determined whether the similarity between the candidate matched frame image and the image of the current frame meets a similarity requirement. If the similarity requirement is met, the tracking procedure, i.e., calculating a pose of a new image of the next frame according to the image of the current frame, is continued.

If the global coordinate distance difference between the candidate matched frame image and the image of the current frame is greater than or equal to the fifth threshold, a global coordinate distance difference between a next candidate matched frame image and the image of the current frame is determined, and so on.

In this embodiment, in the case where features are tracked due to blocking or sudden movement, a third pose of the image of the current frame is determined based on the candidate matched frame image, by transform domain based image registration. If the global coordinate distance difference between the matched frame image and the image of the current frame and the similarity between the candidate matched frame image and the image of the current frame meet preset conditions respectively, SLAM tracking i.e., calculating a pose of a new image of the next frame according to the image of the current frame, is further continued, thus ensuring the continuity of tracking and the accuracy of navigation.

Embodiment IV

Figure 5:
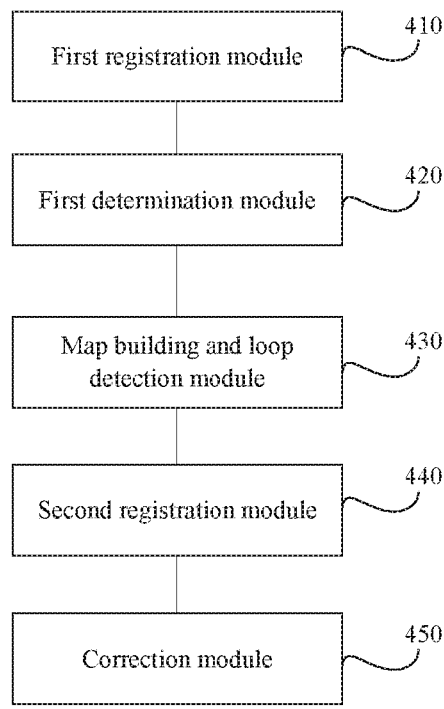
FIG. 5 is a schematic structural diagram of a navigation apparatus based on ground texture images according to an embodiment of the present application.

FIG. 5 is a schematic structural diagram of a navigation apparatus based on ground texture images according to an embodiment of the present application. As shown in FIG. 5, the apparatus includes a first registration module 410 configured to perform transform domain based image registration on an acquired image of the current frame and an image of the previous frame, and determine a first pose of the image of the current frame; a first determination module 420 configured to determine whether the image of the current frame meets a preset condition for creating a key-frame image, and in response to a determination result that the image of the current frame meets the preset condition, output the determination result to a map building and loop detection module; the map building and loop detection module 430 configured to receive the determination result input by the first determination module, insert the image of the current frame as a key-frame image into a map, and perform loop closure detection and determine a loop key-frame image; a second registration module 440 configured to perform transform domain based image registration on the image of the current frame and the loop key-frame image, and determine a second pose of the image of the current frame; and a correction module 450 configured to determine an accumulated error according to the first pose and the second pose of the image of the current frame, and correct the map according to the accumulated error.

In this embodiment, after the first registration module determines a first pose, the first determination module determines that the image of the current frame meets a preset condition for creating a key-frame image, and the map building and loop detection module inserts a key-frame image into a map, and performs loop closure detection and determines a loop key-frame image according to the loop detection, so that the second registration module determines a second pose. The correction module determines an accumulated error according to the first pose and the second pose of the image of the current frame, and corrects the map according to the accumulated error, so that the accuracy of navigation in a complex environment can be achieved.

Based on the above embodiment, the preset condition for creating a key-frame image includes: map building is in an idle state, and the number of image frames between the image of the current frame and the previous key-frame image is greater than a preset first threshold; and a global coordinate distance difference between the image of the current frame and the previous key-frame image is greater than a preset second threshold.

Based on the above embodiment, the map building and loop detection module includes a similarity calculation unit configured to insert the image of the current frame as a key-frame image into the map, and calculate similarities between the image of the current frame and all other key-frame images in the map respectively, and add key-frame images with similarities greater than a third threshold to a candidate set; a candidate unit configured to select from the candidate set at least three key-frame images that meet a loop condition, sort the at least three key-frames in the order of from high to low similarities between the at least three key-frame images and the image of the current frame, and use the key-frame image ranking first as a candidate key-frame image; and a determination unit configured to determine whether a global coordinate distance difference between the candidate key-frame image and the image of the current frame is less than a fourth threshold, and in response to determining that the global coordinate distance difference between the candidate key-frame image and the image of the current frame is less than the fourth threshold, use the candidate key-frame image as a loop key-frame image.

Based on the above embodiment, the navigation apparatus based on ground texture images further includes a matching module configured to, if the image of the previous frame is not a ground texture image, select a preset number of key-frame images, match feature points of each of the preset number of the key-frame images with feature points of the image of the current frame, and determine at least one candidate matched frame image according to a matching result; a third registration module configured to calculate at least one third pose of the image of the current frame according to at least one candidate matched frame image; and a second determination module configured to, based on the at least one third pose of the image of the current frame, determine whether a global coordinate distance difference between any of the at least one candidate matched frame image and the image of the current frame is less than a fifth threshold, and in response to determining that the global coordinate distance difference between any of the at least one candidate matched frame image and the image of the current frame is less than the fifth threshold, calculate a pose of a new image of the next frame according to the image of the current frame. In response to determining that a global coordinate distance difference between an candidate matched frame image and the image of the current frame is greater than or equal to the fifth threshold, it is determined whether a global coordinate distance difference between the next candidate matched frame image and the image of the current frame is smaller than the fifth threshold.

Based on the above embodiment, the first pose, the second pose or the third pose of the image of the current frame includes a rotation and a translation of the movement of the image of the current frame.

Based on the above embodiment, the navigation apparatus based on ground texture images further includes an initialization module configured to determine initial values of global coordinates at an initial position by identifying collected two-dimensional code information.

The navigation apparatus based on ground texture images provided in this embodiment can execute the navigation method based on ground texture images provided in any embodiment of the present application, and has functional modules and beneficial effects corresponding to the executed method.

Embodiment V

Figure 6:
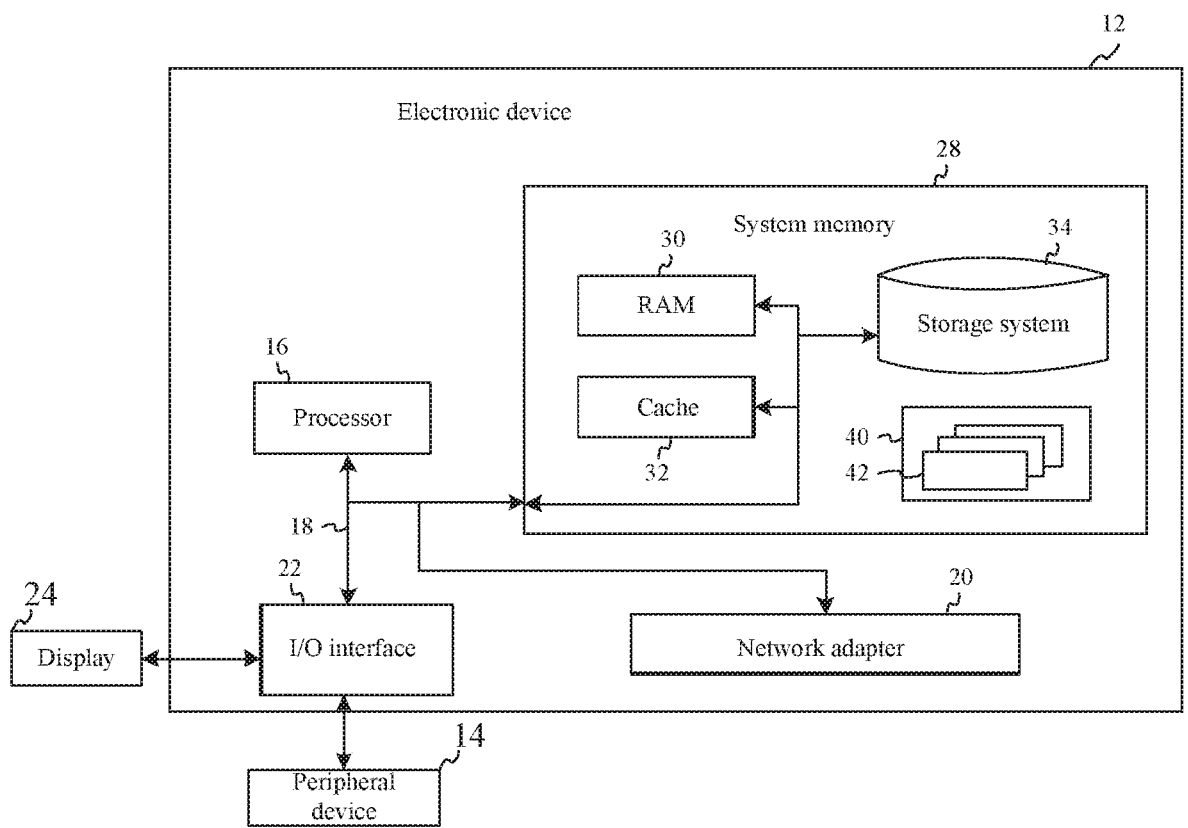
FIG. 6 is a structural diagram of an electronic device according to an embodiment of the present application.

FIG. 6 is a schematic structural diagram of an electronic device according to an embodiment of the present application. FIG. 6 shows a block diagram of an exemplary electronic device 12 adapted to implement embodiments of the present application. In this embodiment, the electronic device can be a robot or other device. The electronic device 12 shown in FIG. 6 is only an example, and has no limitation on the functions and scope of use of the embodiments of the present application.

As shown in FIG. 6, the electronic device 12 is embodied in the form of a general-purpose computing device. Components of the electronic device 12 can include, but are not limited to, at least one processor 16, a system memory 28, and a bus 18 connecting different system components (including the system memory 28 and the processor 16).

The bus 18 represents at least one of several types of bus structures, including a memory or memory controller bus, a peripheral bus, an accelerated graphics port, a processor, or a local bus using any of multiple types of bus structures. For example, these architectures include, but are not limited to, an industry standard architecture (ISA) bus, a microchannel architecture (MAC) bus, an enhanced ISA bus, a video electronics standards association (VESA) local bus and a peripheral component interconnect (PCI) bus.

The electronic device 12 includes multiple types of computer system readable media. These media can be any available media that can be accessed by the electronic device 12, including volatile and non-volatile media, removable and non-removable media.

The system memory 28 can include a computer system readable medium in the form of a volatile memory, such as a random access memory (RAM) 30 and/or a cache memory 32 (cache for short). The electronic device 12 can include other removable/non-removable, volatile/nonvolatile computer system storage media. Only as an example, a storage system 34 can be used to read from and write to a non-removable, non-volatile magnetic medium (not shown in FIG. 6, generally referred to as a "hard drive"). Although not shown in FIG. 6, a magnetic disc drive for reading from and writing to a removable non-volatile magnetic disc (such as a "floppy disc") and an optical disc drive for reading from and writing to a removable non-volatile optical disc (such as a compact disc read-only memory (CD-ROM), a digital video disc-read only memory (DVD-ROM) or other optical medium) can be provided. In these cases, each drive can be connected to the bus 18 through at least one data medium interface. The memory 28 can include at least one program product having a set of (for example, at least one) program modules, which are configured to perform functions of any embodiment of the present application.

A program/utility tool 40 having a set of (at least one) program modules 42 can be stored in, for example, the memory 28. Such program modules 42 includes, but are not limited to, an operating system, at least one application program, other program module(s) and program data. Each or some combination of the examples may include an implementation of a network environment. The program modules 42 generally perform functions and/or methods in the embodiments described in this application.

The electronic device 12 may also communicate with at least one peripheral device 14 (such as a keyboard, a pointing device, a display 24, etc.), and may also communicate with at least one device that enables a user to interact with the electronic device 12, and/or communicate with any device (such as a network card, a modem, etc.) that enables the electronic device 12 to communicate with at least one other computing device. Such communication can be performed through an input/output (I/O) interface 22. Furthermore, the electronic device 12 may also communicate with at least one network (such as a local area network (LAN), a wide area network (WAN), and/or a public network such as the Internet) through a network adapter 20. As shown in figures, the network adapter 20 communicates with other modules of the electronic device 12 through the bus 18. It should be understood that although not shown in the figure, other hardware and/or software modules can be used in conjunction with the electronic device 12, including but not limited to: microcode, a device driver, a redundant processing unit, an external disc drive array, and a redundant arrays of independent drives (RAID) system, a magnetic tape drive, and a data backup storage system.

By running a program stored in the system memory 28, the processor 16 executes at least one functional application and data processing, for example, implementing a navigation method based on ground texture images according to an embodiment of the present application: performing transform domain based image registration on an acquired image of the current frame and an image of the previous frame, and determining a first pose of the image of the current frame; determining whether the image of the current frame meets a preset condition for creating a key-frame image, and in response to determining that the image of the current frame meets the preset condition, inserting the image of the current frame as a key-frame image into a map, and performing loop closure detection and determining a loop key-frame image; performing transform domain based image registration on the image of the current frame and the loop key-frame image, and determining a second pose of the image of the current frame; and determining an accumulated error according to the first pose and the second pose of the image of the current frame, and correcting the map according to the accumulated error, so as to perform navigation according to the corrected map.

Embodiment VI

This embodiment provides a computer-readable storage medium storing a computer program that, when executed by a processor, implements a navigation method based on ground texture images according to an embodiment of the present application: performing transform domain based image registration on an acquired image of the current frame and an image of the previous frame, and determining a first pose of the image of the current frame; determining whether the image of the current frame meets a preset condition for creating a key-frame image, and in response to determining that the image of the current frame meets the preset condition, inserting the image of the current frame as a key-frame image into a map, and performing loop closure detection and determining a loop key-frame image; performing transform domain based image registration on the image of the current frame and the loop key-frame image, and determining a second pose of the image of the current frame; and determining an accumulated error according to the first pose and the second pose of the image of the current frame, and correcting the map according to the accumulated error, so as to perform navigation according to the corrected map.

The computer storage medium in this embodiment can be any combination of at least one computer-readable medium. The computer-readable medium can be a computer-readable signal medium or a computer-readable storage medium. The computer-readable storage medium can be, for example, but not limited to, an electronic, magnetic, optical, electromagnetic, infrared, or semiconductor system, apparatus or device, or any combination thereof. More specific examples (a non-exhaustive list) of the computer-readable storage medium include: an electrical connection with at least one conducting wire, a portable computer disc, a hard disc, an RAM, a read-only memory (ROM), an erasable programmable read-only memory (EPROM) or flash memory, an optical fiber, a portable CD-ROM, an optical storage device, a magnetic storage device, or any suitable combination thereof. In the present application, a computer-readable storage medium can be any tangible medium that contains or stores a program that can be used by or in combination with an instruction execution system, apparatus or device.

The computer-readable signal medium can include a data signal propagated in a baseband or as part of a carrier wave, and the data signal carries computer-readable program codes. Such a propagated data signal can take many forms, including but not limited to an electromagnetic signal, an optical signal, or any suitable combination thereof. The computer-readable signal medium may also be any computer-readable medium other than a computer-readable storage medium, and the computer-readable medium can send, propagate or transmit a program for use by or in connection with an instruction execution system, apparatus or device.

The program codes included in the computer-readable medium can be transmitted by using any appropriate medium, including but not limited to a wireless, wire, optical cable, or radio frequency (RF) medium, or any suitable combination thereof.

The computer program codes for performing the operations of the present application can be written in at least one programming language or multiple programming languages in combination, the programming languages including an object-oriented programming language such as Java, Smalltalk, or C++, and also including a conventional procedural programming language—such as "C" or similar programming language. The program codes can be executed entirely on a user's computer, partly on a user's computer, as an independent software package, partly on a user's computer and partly on a remote computer, or entirely on a remote computer or server. In the case where a remote computer is involved, the remote computer can be connected to a user's computer through any type of network, including an LAN or WAN, or it can be connected to an external computer (such as being connected through the Internet from an Internet service provider).

We claim:

1. A navigation method based on images of ground texture, performed by a robot provided with a collector, which is configured to collect the images of ground texture, the method comprising:

performing transform domain based image registration on an acquired image of a current frame and an image of a previous frame, and determining a first pose of the image of the current frame;

determining whether the image of the current frame meets a preset condition for creating a key-frame image, and in response to determining that the image of the current frame meets the preset condition, inserting the image of the current frame as the key-frame image into a map, and performing loop closure detection and determining a loop key-frame image;

performing transform domain based image registration on the image of the current frame and the loop key-frame image, and determining a second pose of the image of the current frame; and determining an accumulated error according to the first pose and the second pose of the image of the current frame, and correcting the map according to the accumulated error, so as to perform navigation according to the corrected map;

wherein performing transform domain based image registration on the acquired image of the current frame and the image of the previous frame, and determining the first pose of the image of the current frame, comprises:

step 1: performing Fourier transformation on the image $f_1$ of the previous frame and the image $f_2$ of the current frame to obtain $F_1$ and $F_2$;

step 2: eliminating low-frequency noise from $F_1$ and $F_2$ by using a high-pass filter;

step 3: converting the filtered images from a rectangular coordinate system to a log-polar coordinate form;

step 4: performing Fourier transformation on the images $F_1$ and $F_2$ in log-polar coordinates;

step 5: determining a cross-power spectrum $R_1$ of the image $f_1$ of the previous frame and the image $f_2$ of the current frame in the log-polar coordinates based on a transformation result of step 4 and a calculation formula of the cross-power spectrum;

step 6: performing inverse Fourier transformation on the obtained power spectrum $R_1$ to obtain an inverse Fourier transformation result $IR_1$;

step 7: determining coordinates corresponding to a maximum peak value of the inverse Fourier transformation result $IR_1$, and obtaining a scaling factor and a rotation factor according to the coordinates corresponding to the maximum peak value of the inverse Fourier transformation result $IR_1$;

step 8: performing inverse transformation on the image $f_2$ of the current frame according to the obtained scaling factor and rotation factor to obtain a new image $f_3$;

step 9: performing fast Fourier transformation on the images $f_1$ and $f_3$ to obtain $F_1$ and $F_3$, calculating a power spectrum $R_2$ of $F_1$ and $F_3$ based on a power spectrum calculation formula, and performing inverse Fourier transformation on $R_2$ to obtain an inverse Fourier transformation result $IR_2$; and step 10: determining coordinates corresponding to a maximum peak value of the inverse Fourier transformation result $IR_2$ as a translation parameter, and determining the first pose of the image of the current frame according to the translation parameter;

if the image of the previous frame is not an image of ground texture, selecting a preset number of key-frame images, matching feature points of each of the preset number of the key-frame images with feature points of the image of the current frame, and determining at least one candidate matched frame image according to a matching result;

wherein the image of the previous frame is not a ground texture image based upon determining whether the camera is blocked or has sudden movement;

calculating at least one third pose of the image of the current frame respectively according to the at least one candidate matched frame image; and based on the at least one third pose of the image of the current frame, determining whether a distance difference between any of the at least one candidate matched frame image and the image of the current frame in a global coordinate system is less than a fifth threshold, and in response to determining that the distance difference between any of the at least one candidate matched frame image and the image of the current frame in the global coordinate system is less than the fifth threshold, calculating a pose of a new image of a next frame according to the image of the current frame.

2. The method according to claim 1, wherein the preset condition for creating a key-frame image comprises:

map building is in an idle state, and a quantity of image frames between the image of the current frame and a previous key-frame image is greater than a preset first threshold; and a distance difference between the image of the current frame and the previous key-frame image in a global coordinate system is greater than a preset second threshold.

3. The method according to claim 1, wherein said that inserting the image of the current frame as the key-frame image into the map, and performing loop closure detection and determining the loop key-frame image comprises:

inserting the image of the current frame as the key-frame image into the map, and calculating similarities between the image of the current frame and all other key-frame images in the map respectively, and adding key-frame images with similarities greater than a third threshold to a candidate set;

selecting, from the candidate set, at least three key-frame images that meet a loop condition, sorting the at least three key-frames in an order of from high to low similarities between the at least three key-frame images and the image of the current frame, and using a key-frame image ranking first as a candidate key-frame image; and determining whether a distance difference between the candidate key-frame image and the image of the current frame in a global coordinate system is less than a fourth threshold, and in response to determining that the distance difference between the candidate key-frame image and the image of the current frame in the global coordinate system is less than the fourth threshold, using the candidate key-frame image as the loop key-frame image.

4. The method according to claim 1, wherein the first pose, the second pose or the third pose of the image of the current frame comprises a rotation and a translation of a movement of the image of the current frame.

5. The method according to claim 1, further comprising: determining initial coordinate values in a global coordinate system at an initial position by identifying collected two-dimensional code information.

6. An electronic device, comprising:
at least one processor; and
a memory configured to store at least one program, wherein the at least one program, when executed by the at least one processor, causes the at least one processor to implement operations of:
performing transform domain based image registration on an acquired image of a current frame and an image of a previous frame, and determining a first pose of the image of the current frame;

determining whether the image of the current frame meets a preset condition for creating a key-frame image, and in response to determining that the image of the current frame meets the preset condition, inserting the image of the current frame as the key-frame image into a map, and performing loop closure detection and determining a loop key-frame image;

performing transform domain based image registration on the image of the current frame and the loop key-frame image, and determining a second pose of the image of the current frame; and determining an accumulated error according to the first pose and the second pose of the image of the current frame, and correcting the map according to the accumulated error, so as to perform navigation according to the corrected map;

wherein performing transform domain based image registration on the acquired image of the current frame and the image of the previous frame, and determining the first pose of the image of the current frame, comprises:

step 1: performing Fourier transformation on the image $f_1$ of the previous frame and the image $f_2$ of the current frame to obtain $F_1$ and $F_2$;

step 2: eliminating low-frequency noise from $F_1$ and $F_2$ by using a high-pass filter;

step 3: converting the filtered images from a rectangular coordinate system to a log-polar coordinate form;

step 4: performing Fourier transformation on the images $F_1$ and $F_2$ in log-polar coordinates;

step 5: determining a cross-power spectrum $R_1$ of the image $f_1$ of the previous frame and the image $f_2$ of the current frame in the log-polar coordinates based on a transformation result of step 4 and a calculation formula of the cross-power spectrum;

step 6: performing inverse Fourier transformation on the obtained power spectrum $R_1$ to obtain an inverse Fourier transformation result $IR_1$;

step 7: determining coordinates corresponding to a maximum peak value of the inverse Fourier transformation result $IR_1$, and obtaining a scaling factor and a rotation factor according to the coordinates corresponding to the maximum peak value of the inverse Fourier transformation result $IR_1$;

step 8: performing inverse transformation on the image $f_2$ of the current frame according to the obtained scaling factor and rotation factor to obtain a new image $f_3$;

step 9: performing fast Fourier transformation on the images $f_1$ and $f_3$ to obtain $F_1$ and $F_3$, calculating a power spectrum $R_2$ of $F_1$ and $F_3$ based on a power spectrum calculation formula, and performing inverse Fourier transformation on $R_2$ to obtain an inverse Fourier transformation result $IR_2$; and step 10: determining coordinates corresponding to a maximum peak value of the inverse Fourier transformation result $IR_2$ as a translation parameter, and determining the first pose of the image of the current frame according to the translation parameter;

if the image of the previous frame is not an image of ground texture, selecting a preset number of key-frame images, matching feature points of each of the preset number of the key-frame images with feature points of the image of the current frame, and determining at least one candidate matched frame image according to a matching result;

wherein the image of the previous frame is not a ground texture image based upon determining whether the camera is blocked or has sudden movement;

calculating at least one third pose of the image of the current frame respectively according to the at least one candidate matched frame image; and based on the at least one third pose of the image of the current frame, determining whether a distance difference between any of the at least one candidate matched frame image and the image of the current frame in a global coordinate system is less than a fifth threshold, and in response to determining that the distance difference between any of the at least one candidate matched frame image and the image of the current frame in the global coordinate system is less than the fifth threshold, calculating a pose of a new image of a next frame according to the image of the current frame.

7. The electronic device according to claim 6, wherein the preset condition for creating a key-frame image comprises:

map building is in an idle state, and a quantity of image frames between the image of the current frame and a previous key-frame image is greater than a preset first threshold; and a distance difference between the image of the current frame and the previous key-frame image in a global coordinate system is greater than a preset second threshold.

8. The electronic device according to claim 6, wherein said that inserting the image of the current frame as the key-frame image into the map, and performing loop closure detection and determining the loop key-frame image comprises:

inserting the image of the current frame as the key-frame image into the map, and calculating similarities between the image of the current frame and all other key-frame images in the map respectively, and adding key-frame images with similarities greater than a third threshold to a candidate set;

selecting, from the candidate set, at least three key-frame images that meet a loop condition, sorting the at least three key-frames in an order of from high to low similarities between the at least three key-frame images and the image of the current frame, and using a key-frame image ranking first as a candidate key-frame image; and determining whether a distance difference between the candidate key-frame image and the image of the current frame in a global coordinate system is less than a fourth threshold, and in response to determining that the distance difference between the candidate key-frame image and the image of the current frame in a global coordinate system is less than the fourth threshold, using the candidate key-frame image as the loop key-frame image.

9. The electronic device according to claim 6, wherein the at least one program, when executed by the at least one processor, causes the at least one processor to further implement steps of:

if the image of the previous frame is not an image of ground texture, selecting a preset number of key-frame images, matching feature points of each of the preset number of the key-frame images with feature points of the image of the current frame, and determining at least one candidate matched frame image according to a matching result;

calculating at least one third pose of the image of the current frame respectively according to the at least one candidate matched frame image; and based on the at least one third pose of the image of the current frame, determining whether a distance difference between any of the at least one candidate matched frame image and the image of the current frame in a global coordinate system is less than a fifth threshold, and in response to determining that the distance difference between any of the at least one candidate matched frame image and the image of the current frame in the global coordinate system is less than the fifth threshold, calculating a pose of a new image of a next frame according to the image of the current frame.

10. The electronic device according to claim 9, wherein the first pose, the second pose or the third pose of the image of the current frame comprises a rotation and a translation of a movement of the image of the current frame.

11. The electronic device according to claim 6, wherein the at least one program, when executed by the at least one processor, causes the at least one processor to further implement steps of:

determining initial coordinate values in a global coordinate system at an initial position by identifying collected two-dimensional code information.

12. A non-transitory computer-readable storage medium storing a computer program that, when executed by a processor, implements operations of:

performing transform domain based image registration on an acquired image of a current frame and an image of a previous frame, and determining a first pose of the image of the current frame;

determining whether the image of the current frame meets a preset condition for creating a key-frame image, and in response to determining that the image of the current frame meets the preset condition, inserting the image of the current frame as the key-frame image into a map, and performing loop closure detection and determining a loop key-frame image;

performing transform domain based image registration on the image of the current frame and the loop key-frame image, and determining a second pose of the image of the current frame; and determining an accumulated error according to the first pose and the second pose of the image of the current frame, and correcting the map according to the accumulated error, so as to perform navigation according to the corrected map;

wherein performing transform domain based image registration on the acquired image of the current frame and the image of the previous frame, and determining the first pose of the image of the current frame, comprises:

step 1: performing Fourier transformation on the image $f_1$ of the previous frame and the image $f_2$ of the current frame to obtain $F_1$ and $F_2$;

step 2: eliminating low-frequency noise from $F_1$ and $F_2$ by using a high-pass filter;

step 3: converting the filtered images from a rectangular coordinate system to a log-polar coordinate form;

step 4: performing Fourier transformation on the images $F_1$ and $F_2$ in log-polar coordinates;

step 5: determining a cross-power spectrum $R_1$ of the image $f_1$ of the previous frame and the image $f_2$ of the current frame in the log-polar coordinates based on a transformation result of step 4 and a calculation formula of the cross-power spectrum;

step 6: performing inverse Fourier transformation on the obtained power spectrum $R_1$ to obtain an inverse Fourier transformation result $IR_1$;

step 7: determining coordinates corresponding to a maximum peak value of the inverse Fourier transformation result $IR_1$, and obtaining a scaling factor and a rotation factor according to the coordinates corresponding to the maximum peak value of the inverse Fourier transformation result $IR_1$;

step 8: performing inverse transformation on the image $f_2$ of the current frame according to the obtained scaling factor and rotation factor to obtain a new image $f_3$;

step 9: performing fast Fourier transformation on the images $f_1$ and $f_3$ to obtain $F_1$ and $F_3$, calculating a power spectrum $R_2$ of $F_1$ and $F_3$ based on a power spectrum calculation formula, and performing inverse Fourier transformation on $R_2$ to obtain an inverse Fourier transformation result $IR_2$; and step 10: determining coordinates corresponding to a maximum peak value of the inverse Fourier transformation result $IR_2$ as a translation parameter, and determining the first pose of the image of the current frame according to the translation parameter;

if the image of the previous frame is not an image of ground texture, selecting a preset number of key-frame images, matching feature points of each of the preset number of the key-frame images with feature points of the image of the current frame, and determining at least one candidate matched frame image according to a matching result;

wherein the image of the previous frame is not a ground texture image based upon determining whether the camera is blocked or has sudden movement;

calculating at least one third pose of the image of the current frame respectively according to the at least one candidate matched frame image; and based on the at least one third pose of the image of the current frame, determining whether a distance difference between any of the at least one candidate matched frame image and the image of the current frame in a global coordinate system is less than a fifth threshold, and in response to determining that the distance difference between any of the at least one candidate matched frame image and the image of the current frame in the global coordinate system is less than the fifth threshold, calculating a pose of a new image of a next frame according to the image of the current frame.

13. The non-transitory storage medium according to claim 12, wherein the preset condition for creating a key-frame image comprises:

map building is in an idle state, and a quantity of image frames between the image of the current frame and a previous key-frame image is greater than a preset first threshold; and a distance difference between the image of the current frame and the previous key-frame image in a global coordinate system is greater than a preset second threshold.

14. The non-transitory storage medium according to claim 12, wherein said that inserting the image of the current frame as the key-frame image into the map, and performing loop closure detection and determining the loop key-frame image comprises:

inserting the image of the current frame as the key-frame image into the map, and calculating similarities between the image of the current frame and all other key-frame images in the map respectively, and adding key-frame images with similarities greater than a third threshold to a candidate set;

selecting, from the candidate set, at least three key-frame images that meet a loop condition, sorting the at least three key-frames in an order of from high to low similarities between the at least three key-frame images and the image of the current frame, and using a key-frame image ranking first as a candidate key-frame image; and determining whether a distance difference between the candidate key-frame image and the image of the current frame in a global coordinate system is less than a fourth threshold, and in response to determining that the distance difference between the candidate key-frame image and the image of the current frame in the global coordinate system is less than the fourth threshold, using the candidate key-frame image as the loop key-frame image.

15. The non-transitory storage medium according to claim 12, when executed by a processor, further implements operations of:

if the image of the previous frame is not an image of ground texture, selecting a preset number of key-frame images, matching feature points of each of the preset number of the key-frame images with feature points of the image of the current frame, and determining at least one candidate matched frame image according to a matching result;

calculating at least one third pose of the image of the current frame respectively according to the at least one candidate matched frame image; and based on the at least one third pose of the image of the current frame, determining whether a distance difference between any of the at least one candidate matched frame image and the image of the current frame in a global coordinate system is less than a fifth threshold, and in response to determining that the distance difference between any of the at least one candidate matched frame image and the image of the current frame in the global coordinate system is less than the fifth threshold, calculating a pose of a new image of a next frame according to the image of the current frame.

16. The non-transitory storage medium according to claim 15, wherein the first pose, the second pose or the third pose of the image of the current frame comprises a rotation and a translation of a movement of the image of the current frame.

17. The non-transitory storage medium according to claim 12, when executed by a processor, further implements operations of:

determining initial coordinate values in a global coordinate system at an initial position by identifying collected two-dimensional code information.

* * * * *